(12) United States Patent
Ivy

(10) Patent No.: US 11,172,672 B2
(45) Date of Patent: Nov. 16, 2021

(54) PORTABLE HUNTING BLIND

(71) Applicant: Eugene W. Ivy, Portland, OR (US)

(72) Inventor: Eugene W. Ivy, Portland, OR (US)

( * ) Notice: Subject to any disclaimer, the term of this patent is extended or adjusted under 35 U.S.C. 154(b) by 0 days.

(21) Appl. No.: 16/927,979

(22) Filed: Jul. 13, 2020

(65) Prior Publication Data
US 2021/0000100 A1 Jan. 7, 2021

Related U.S. Application Data

(63) Continuation-in-part of application No. 16/427,232, filed on May 30, 2019, now Pat. No. 10,711,482.

(51) Int. Cl.
*A01M 31/02* (2006.01)
*E04H 15/00* (2006.01)
*E04H 15/54* (2006.01)

(52) U.S. Cl.
CPC ......... *A01M 31/025* (2013.01); *E04H 15/001* (2013.01); *E04H 15/008* (2013.01); *E04H 15/54* (2013.01)

(58) Field of Classification Search
CPC ... A01M 31/025; E04H 15/001; E04H 15/008
See application file for complete search history.

(56) References Cited

U.S. PATENT DOCUMENTS

| | | | | |
|---|---|---|---|---|
| 2,594,410 A * | 4/1952 | Feldpausch | ......... | A01M 31/025 135/141 |
| 3,709,237 A * | 1/1973 | Smith | ................... | E04H 1/1244 135/87 |
| 3,913,598 A * | 10/1975 | Glutting, Jr. | ............ | E04H 15/48 135/152 |
| 4,506,467 A * | 3/1985 | Strung | ................ | A01M 31/025 43/1 |
| 4,554,937 A * | 11/1985 | Irwin | .................... | E04H 15/001 135/100 |
| 5,373,863 A * | 12/1994 | Prizio | ................. | A01M 31/025 135/117 |
| 6,164,005 A * | 12/2000 | Copeland | ............ | A01M 31/025 135/901 |
| 6,408,865 B1 * | 6/2002 | Bliss | ................... | A01M 31/025 135/117 |
| 7,743,781 B2 * | 6/2010 | Slaughter | ............ | A01M 31/025 135/117 |
| 8,429,858 B1 * | 4/2013 | Robinson | .................. | E04H 9/14 52/79.5 |

(Continued)

*Primary Examiner* — Noah Chandler Hawk
(74) *Attorney, Agent, or Firm* — J. Douglas Wells; McCoy Russell LLP

(57) ABSTRACT

A portable hunting blind having a plurality of foldable flat semi-rigid or rigid panels adapted to be arranged in an upright orientation to enclose an interior space sized and adapted to for concealing a hunter on all sides within the interior space, the unfolded panels having a top edge formed to include troughs of varying depths and shapes to provide improved camouflage and support for resting the barrel of a gun. The unfolded panels are connected in a side-by-side manner that permits folding the panels in an accordion-like fashion, and shaped so as to create a downward angle of the exterior side surfaces of the blind so that reflective material comprising the exterior surfaces reflect more of the ground radially outward from the panels than features above the ground.

20 Claims, 18 Drawing Sheets

(56) References Cited

U.S. PATENT DOCUMENTS

| | | | |
|---|---|---|---|
| 8,579,007 B2* | 11/2013 | Pottmeyer | A01M 31/025 |
| | | | 160/229.1 |
| 10,704,291 B2* | 7/2020 | McInerney | E04H 15/008 |
| 2007/0006909 A1* | 1/2007 | Lewis | A01M 31/025 |
| | | | 135/115 |

* cited by examiner

PORTABLE HUNTING BLIND

CROSS-REFERENCE TO RELATED APPLICATIONS

The present application claims priority to U.S. patent application Ser. No. 16/427,232, entitled "Portable Hunting Blind", and filed on May 30, 2019, now issued as U.S. Pat. No. 10,711,482. The entire contents of the above-listed application are hereby incorporated by reference for all purposes.

BACKGROUND OF THE INVENTION

The technical field of invention relates to portable hunting blinds. More particularly, the present invention pertains to methods and designs for a highly portable, very lightweight, self-standing hunting blind.

Different designs for hunting blinds used for concealing a hunter from deer, ducks, coyote, turkey, and other game animals have been disclosed in various publications and products. The different designs provide various features and capabilities. Several portable deer blind designs comprise tent-like structure and materials, often using sewn panels of camouflage patterned thin polyester or nylon fabrics, mesh shoot-through window panels, and single-configuration tent-like interconnected poles. One such blind is the Ameristep Care Taker blind, which is a substantially square 2-person tent-like structure comprising a camouflage patterned thin fabric roof and sides with mesh windows over interconnected poles. The blind is set up in the same way a standard camping tent is set up. An internal construction of single-configuration/single-purpose interconnected tent-poles is opened within the polyester or nylon fabric shell or tent to create a single-purpose enclosed interior space within the blind. The blind is collapsed in the same way a standard camping tent is taken down. The single-purpose designed interconnected poles are collapsed, and the fabric material is folded up. When set up, the blind is approximately 69 inches tall and has foot print of approximately 60 by 60 inches. The blind weighs approximately 16 lbs.

Other designs comprise open-sided, uncovered ground blinds comprising a number of side panels that, when set up, provide concealment of the hunter to game only on one side, leaving the area behind the hunter exposed to the environment. One such blind is the Cut N Run 2-panel blind by Rhino Blinds, which comprises two panels approximately 56 inches in height that extend horizontally approximately 112 inches (when positioned fully open (or flat) at 180 degrees from one another). The panels comprise a fabric with window openings cut into them, along with interconnected poles to provide structure. The blind includes substantially straight side and top edges. The weight is approximately 8 lbs.

Another portable hunting blind is described in U.S. Pat. No. 8,579,007 by Pottmeyer et al., assigned to GhostBlind Industries, Inc. (hereinafter, GhostBlind). A version of the GhostBlind product comprising 4-panels, has a height of approximately 46 inches, a (flat or fully open) width of 102 inches, and a weight of approximately 8 lbs. The panels may be set up in a semi-circle or arch to provide concealment of the areas in front of the hunter and leaving the areas behind the hunter exposed. Each panel is rigid and incorporates a reflective exterior mirror finish for reflecting the exterior environment. The panels are intended to be set up with an outward angle so that the exterior surface of the panels reflect greater portions of the ground in front of the blind instead of potentially portions of sky. When set up, the blind comprises an open-sided, uncovered ground blind for providing concealment of the hunter to game only on one side. The blind may be collapsed by folding each of the panels together like leaves in a book, with the collapsed blind comprising a rigid stack of panels.

Each of the existing portable hunting blind designs has disadvantages in terms of cost, complexity of design, ease of use, feature content, method of recommended and actual use, form factor and ergonomics of the device, design aesthetics, and/or other factors. What is needed are designs for a portable hunting blind, that address one or more disadvantage of existing designs.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

For a more complete understanding of the present invention, the drawings herein illustrate examples of the invention. The drawings, however, do not limit the scope of the invention. Similar references in the drawings indicate similar elements.

DETAILED DESCRIPTION OF PREFERRED EMBODIMENTS

Figure 1:
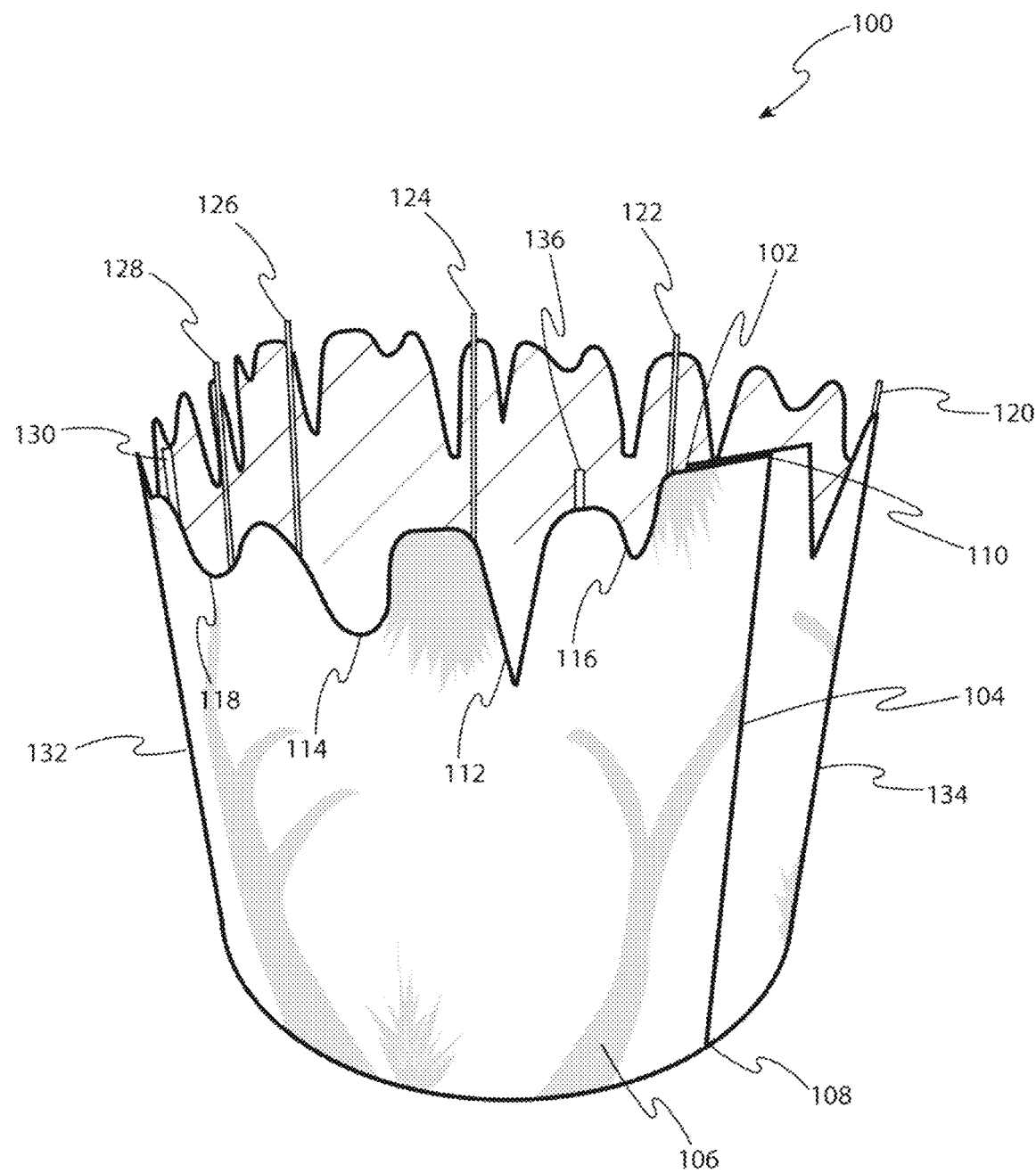
FIG. 1 is a perspective view of a portable hunting blind, according to preferred embodiments.

In the following detailed description, numerous specific details are set forth in order to provide a thorough understanding of the preferred embodiments. However, those skilled in the art will understand that the present invention may be practiced without these specific details, that the present invention is not limited to the depicted embodiments, and that the present invention may be practiced in a variety of alternate embodiments. In other instances, well known methods, procedures, components, and systems have not been described in detail.

As an overview, preferred embodiments comprise a portable hunting blind having rollable semi-rigid side material adapted to be supported in an upright orientation by a plurality of rod supports, with the side material sized and adapted to be positioned to form a closed shape for concealing a hunter within an interior of the shape. The top edges of the side material is preferably formed to include troughs of varying depths and shapes to provide greater camouflage characteristics, provide positions for resting the barrel of a gun or other apparatus, and provide areas for visual line of sight for use by the hunter positioned within the interior of the blind. The side material is preferably comprised of semi-rigid material that can be easily cut with a knife but that does not easily rip once cut, so that a hunter may modify the top edge of the blind to create uniquely sized barrel rest shapes or additional through holes within the side material.

The blind is preferably sized to accommodate a hunter with chair, and enough room for a small heat source such as canned heat (fuel made from denatured and jellied alcohol), and an ozone generator or deodorizer. Preferred embodiments comprise side material having an approximate flat dimension of 4 feet in height by 12 feet in length, whereby the side material encloses a space having a perimeter of approximately 12 feet. The side material is preferably flexibly positionable into a (closeable) circle having a circumference of approximately 12 feet and diameter of approximately 3.8 feet, or any shape, by repositioning the plurality of support rods. The side material is further preferably adapted to allow for interconnected two or more blinds together to increase the perimeter and interior space of the (resulting, combined) blind.

Each of the support rods is preferably capable of being selectively adjusted downward to effectively stake a portion of the side material into the ground or surface beneath the blind. The blind further preferably includes a plurality of anchor receptacles through which standard tent stakes may be used to further secure a bottom edge of the blind side material.

Preferred embodiments further comprise an optional cover for rain protection and added camouflage from above.

In other preferred embodiments, the portable blind comprises a plurality of flat semi-rigid or rigid panels connected together so that when closed, provide an enclosed hunting blind for concealing a hunter within the enclosed space. Each of the panels is foldably attached to an adjacent panel, and, when unfolded (from an accordion "stack" of folded panels) may be closed so as to circumferentially enclose a space within which the hunter may sit. Each of the panels preferably includes a top edge having peaks and valleys, preferably with peaks where the panels is adjoined to an adjacent panel. The top edge in each panel preferably includes at least one valley or trough upon which the hunter may rest the barrel of a gun. The top edge is preferably about an inch longer than a bottom edge so that when sixteen panels (with approximately 11" across (width) at the top and 10" across (width) are attached together, the result is an interconnection of slightly wedge shaped panels that, when laid out flat on the ground, has an arc (rather than the rectangular shape of the rollable semi-rigid material described for other embodiments, and that, when positioned upright (and closed to enclose an interior space) so that the lower edge of each panel sets upon the ground, the blind appears substantially as in FIG. 1, except that the side material comprises individual flat panels and the sides are (because of the wedge shape, i.e., narrower base edge than top edge) is angled outward so that reflective material comprising the exterior of the blind reflects a greater portion of the ground upon which the blind is positioned rather than the sky.

Embodiments comprising the individual panels preferably comprise side panels having a height of approximately 46 inches. Sixteen panels having approximately 11 inches top width and 10 inches bottom width creates a top edge circumference of approximately 176 inches and a bottom edge circumference of 160 inches when the panel-based blind embodiments (hereinafter also referred to as a "reflective panel-based blind" or "reflective blind") is set up to have an orientation similar to that shown in FIG. 16.

Although the preferred embodiments may be described in the context of a portable hunting blind, each of the described innovations, among others described herein, are separable and may be applied in different combinations and to devices adapted for other, non-hunting blind applications.

Turning now to the figures in more detail, FIG. 1 is a perspective view of a portable hunting blind 100, according to preferred embodiments. The blind 100 preferably comprises a semi-rigid side material having an edge 104 at one end, the edge 104 having a top 110 and a bottom 108 that defines a height 108-110 of the sides of the blind 100, and extending to form a closed shape. In FIG. 1, the blind 100 comprises the side material formed into a substantially cylindrical orientation, with a width or diameter 132-134. Support rods 120, 122, 124, 126, 128, 130, and 136 are preferably equally spaced along the side material to provide structural support across the height 108-110 of the side material and to permit staking down the blind 100. The top edge of the blind 100 is preferably cut or formed with an irregular edge. As shown, the top edge of the blind 100 preferably incorporates cutouts and rounded edges such as a relatively shallow valley 116, a deeper vee cut 112, a deep U shaped trough 114, and a shallower U shaped trough 118.

The number and shape of the troughs and valleys may be different. However, the present inventor discovered that the blind 100 should incorporate multiple troughs and valleys cut into the top edge to reduce the amount of straight lines along the upper edge of the blind (thus improving camouflage characteristics of the blind) and to provide the hunter with multiple viewing ports and areas to rest the barrel of a gun, the end of a spotting scope, or other hunting apparatus. The side material preferably comprises semi-rigid with sufficient strength and resistance to deformation to support at least part of the weight of a gun barrel resting across a top edge of the side material, such as in one of the valleys, cuts, or troughs described herein. The present inventor further discovered that the side material should preferably comprise a semi-ridge material with enough strength to resist ripping in a V shaped trough such as vee cut 112, and resilient enough to allow for the hunter to cut a new or modified trough along the top edge, or even a through hole anywhere in the side material, without jeopardizing the structural integrity of the blind. The present inventor discovered that using a thin (approximately 5 mm thick) closed cell foam material, such as for example expanded polyethylene (or EPE) for the side material, provides advantageous side material characteristics for the top edge troughs and valleys (and for structural integrity of the blind as oriented and configures as shown in FIG. 1). The present inventor discovered that constructing the blind 100 substantially as shown in FIG. 1 and described herein, comprising a semi-rigid EPE side material, with support rods to provide added structure and that may be pushed downward to anchor the side material to a surface under the side material, and with optional additional stakes along a turned up lower edge of the blind, provides considerably robust wind resistance when tested using, for example, a leaf blower to simulate high wind conditions.

The exterior surfaces of the side material preferably comprise a camouflage pattern 106, which may be any of a wide variety of camouflage patterns desired. The present inventor discovered that the side material preferably includes a camouflage exterior and an interior surface that is darkened or blackened in the areas near the troughs and valleys of the top edge so that visibility into the top portion of the blind is obscured.

Figure 2:
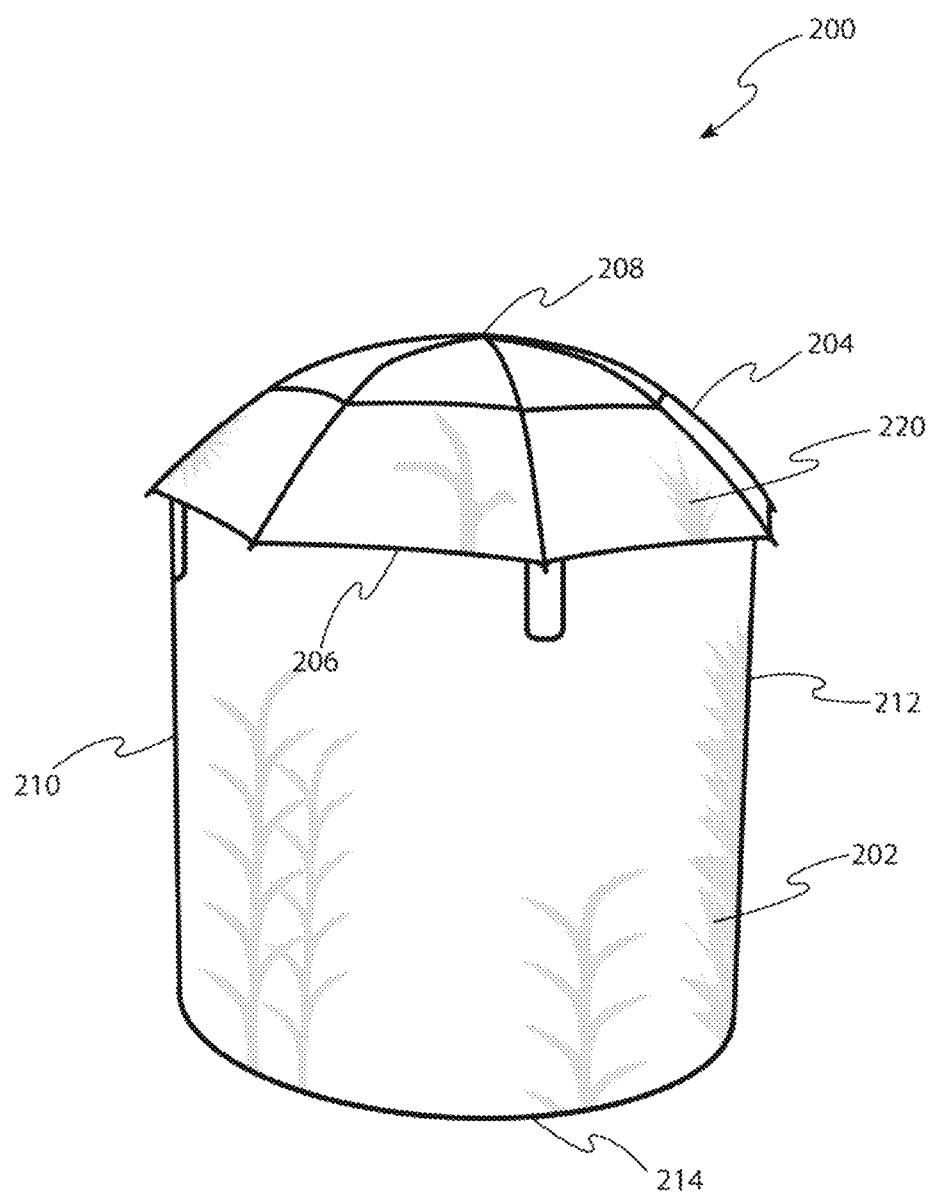
FIG. 2 is a perspective view of a portable hunting blind with optional cover, according to preferred embodiments.

FIG. 2 is a perspective view of a portable hunting blind 200 with optional cover 204, according to preferred embodiments. The blind 200 preferably comprises a cover 204, such as an umbrella with camouflage pattern 220, covering a blind such as blind 100 shown in FIG. 1. The blind material in the blind 200 is shown with a different exterior surface camouflage pattern 202 and with different, less preferred top edge cutouts. The blind 200 is shown with an overall height from a bottom edge 214 to a top point 208 of the cover, and an overall width from one side 210 to the other side 212. The footprint of the blind 200, in the example shown in FIG. 2 is substantially circular, with the interior space created by the sides of the blind being substantially cylindrical.

Figure 3:
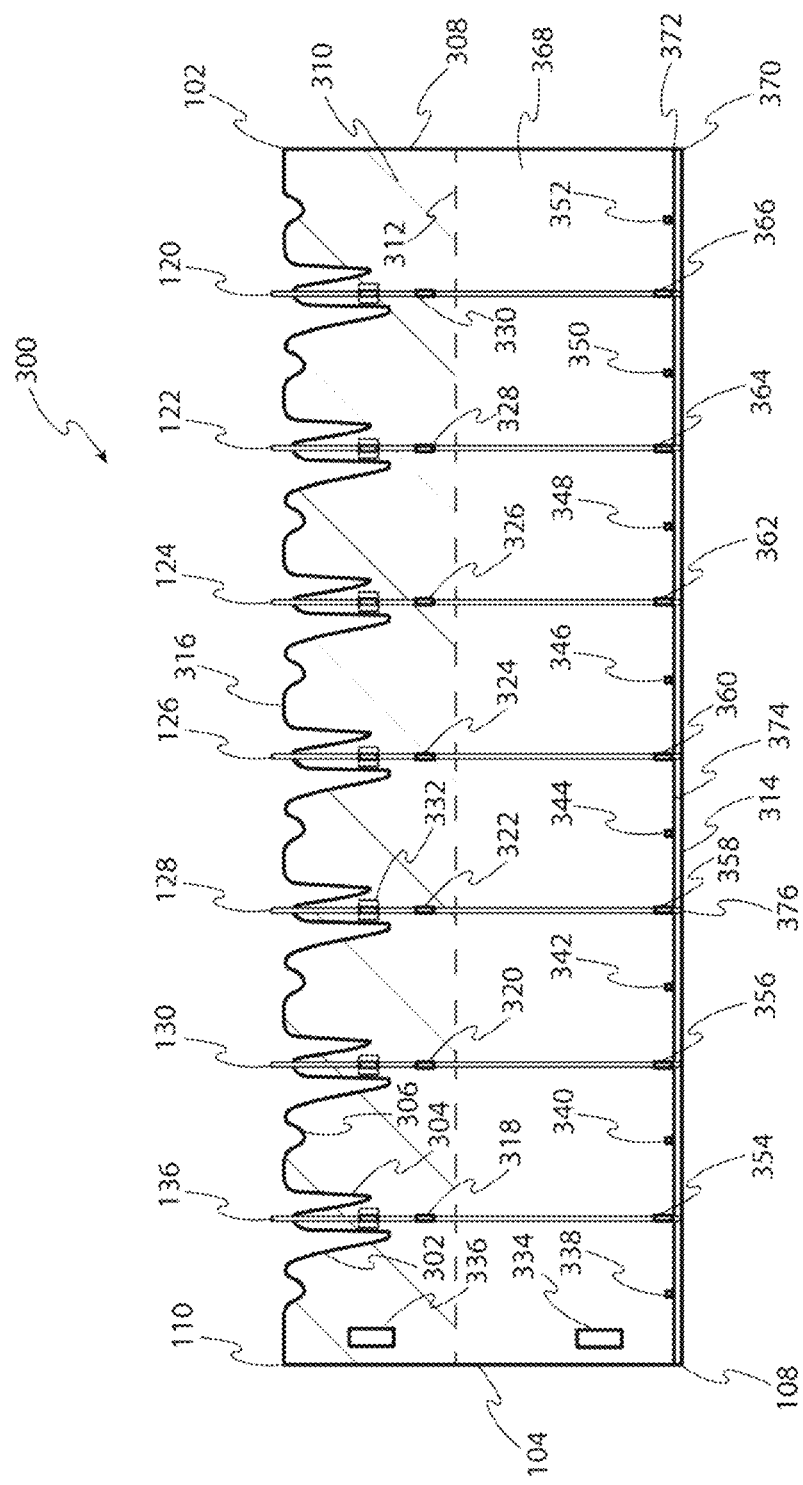
FIG. 3 depicts the interior side of the portable hunting blind shown in FIG. 1 when unrolled to show the side material in a flat orientation, according to preferred embodiments.

FIG. 3 depicts the interior side 300 of the portable hunting blind shown in FIG. 1 when unrolled to show the side material in a flat orientation, according to preferred embodiments. The side material is shown with a length 104-308 between a first edge 104 and a second lengthwise opposite edge 308. The height of the side material is 110-108 along edge 104 and 102-370 along edge 308. Preferred embodiments comprise a height 110-108 (102-370) of approximately 4 feet (or 48 inches less a two inch turned up lower edge, or approximately 46 inches). The length 104-308 is preferably approximately 12 feet. In other embodiments, a lower height 110-108 (102-370) is preferably lower to, for example, better accommodate a blind having viewing above the top edge at a height more typical for turkey hunting. In less preferred embodiments, the height and length dimensions of the side material may be different than shown and described.

The present inventor determined that darkening or blackening the upper portion of the interior side material, for example from a height 313 to the top 102, is preferred to improve the camouflage characteristics of the blind. The present inventor discovered that using a closed cell foam material with aluminum foil laminated on the inside surface 368 (or throughout the entire interior surface and then painted black above the height 312) provides thermal and other beneficial properties. The blind preferably comprises an aluminum foil interior surface for thermal reflectivity when a heat source is used within the interior space of the blind to provide heat for the hunter. The present inventor discovered that, unlike any other blinds available, side material comprising aluminum foil laminated closed cell foam provides wind resistance, moisture resistance, thermal insulation, heat reflectivity within the interior space of the blind, enough structural rigidity to work as a self-standing blind when adapted and configured as shown in FIG. 3 and set up as in FIG. 1, and enough flexibility and resilience to allow for repeatedly rolling up and unrolling the side material.

The interior side 300 preferably comprises a plurality of support rods 120, 122, 124, 126, 128, 130, and 136 such as the seven shown, each running through an upper tube 330, 328, 326, 324, 322, 320, and 318, respectively, and running through a lower tube 366, 364, 362, 360, 358, 356, and 354, respectively. All of the tubes (i.e upper tubes 330, 328, 326, 324, 322, 320, and 318, and lower tubes 366, 364, 362, 360, 358, 356, and 354) are preferably affixed or adhered permanently to the inside surface of the side material, substantially as shown. Each support rod is preferably able to run freely into and out of the aforementioned tubes, and each also preferably has a corresponding hook and loop type fastener such as the hook and look fastener patch 332 associated with support rod 128. As will be described in more detail with respect to FIG. 6, a piece of hook and loop type fastener wrapped around each rod is preferably used to grasp a corresponding patch of hook and loop fastener affixed to the interior side of the blind side material, as shown in FIG. 3. Each of the support rods may be released from a corresponding hook and loop patch fattener and pushed downward through a corresponding upper tube and simultaneously through a corresponding lower tube, to drive the lower end of the support rod into a ground or supporting surface beneath the lower edge 314 of the blind side material.

The interior side 300 preferably includes a plurality of additional stake down tubes (or anchor receptacles) 338, 340, 342, 344, 346, 348, 350, and 352 between each of the support rods. The number, size, shape, and spacing of the additional stake down tubes may be different. The stake down tubes are preferably permanently affixed to the interior side 300 as shown, and they are preferably sized to receive a standard tent stake (for example, a 9 inch aluminum stake).

The interior side 300 preferably includes a lower turned up edge 370-372 along the length 108-370 of the side material. The turned up edge 370-372 preferably comprises about 2 inches of side material turned up and permanently adhered to the interior surface. Preferably, the upper edge 374 of the turned up portion provides a lower boundary for each of the lower (support rod) tubes 366, 364, 362, 360, 358, 356, and 354 and stake down tubes 338, 340, 342, 344, 346, 348, 350, and 352. The inventor discovered that the turned up portion along the lower edge provides additional rigidity and structure to the overall blind construction, as shown in FIGS. 1 and 3.

Figure 4:
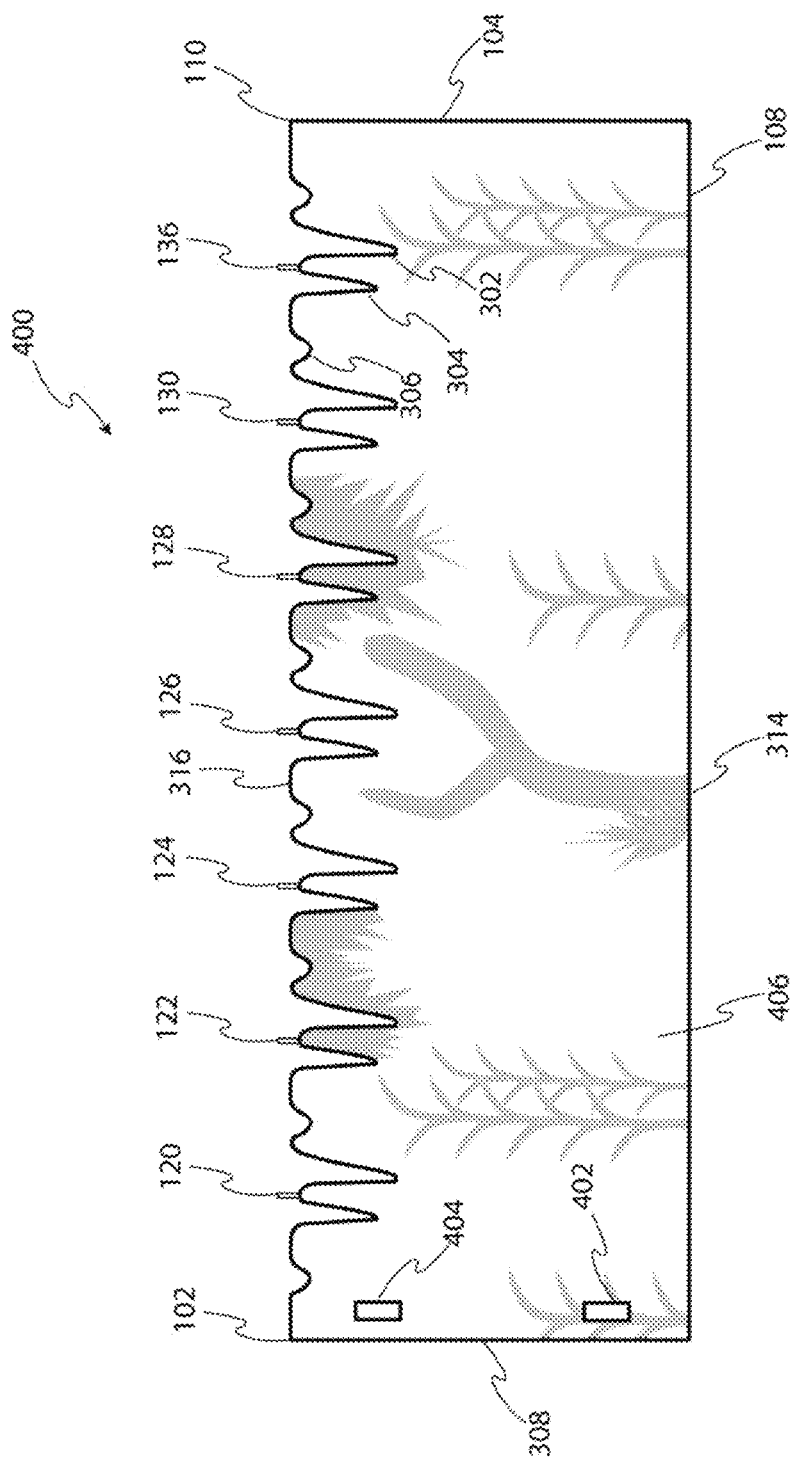
FIG. 4 depicts the exterior side of the portable hunting blind shown in FIG. 1 when unrolled to show the side material in a flat orientation, according to preferred embodiments.

FIG. 4 depicts the exterior side 400 of the portable hunting blind shown in FIG. 1 when unrolled to show the side material in a flat orientation, according to preferred embodiments. The exterior side 400 is the opposite side of the interior side 300, and cutout troughs/valleys 302, 304, 306 and top edge peak 316 are provides for reference to those features between FIGS. 3 and 4, and for reference of support rod 128 as described in greater detail with respect to FIGS. 6, 7, and 8. The exterior surface 406 preferably comprises a camouflage pattern surface. In preferred embodiments, an upper hook and loop fastener 404 and a lower hook and loop fastener 402 are affixed to the exterior surface 406 to be aligned with correspondingly mating hook and loop fasteners 336 and 334 on the interior surface 300 shown in FIG. 3.

Figure 5:
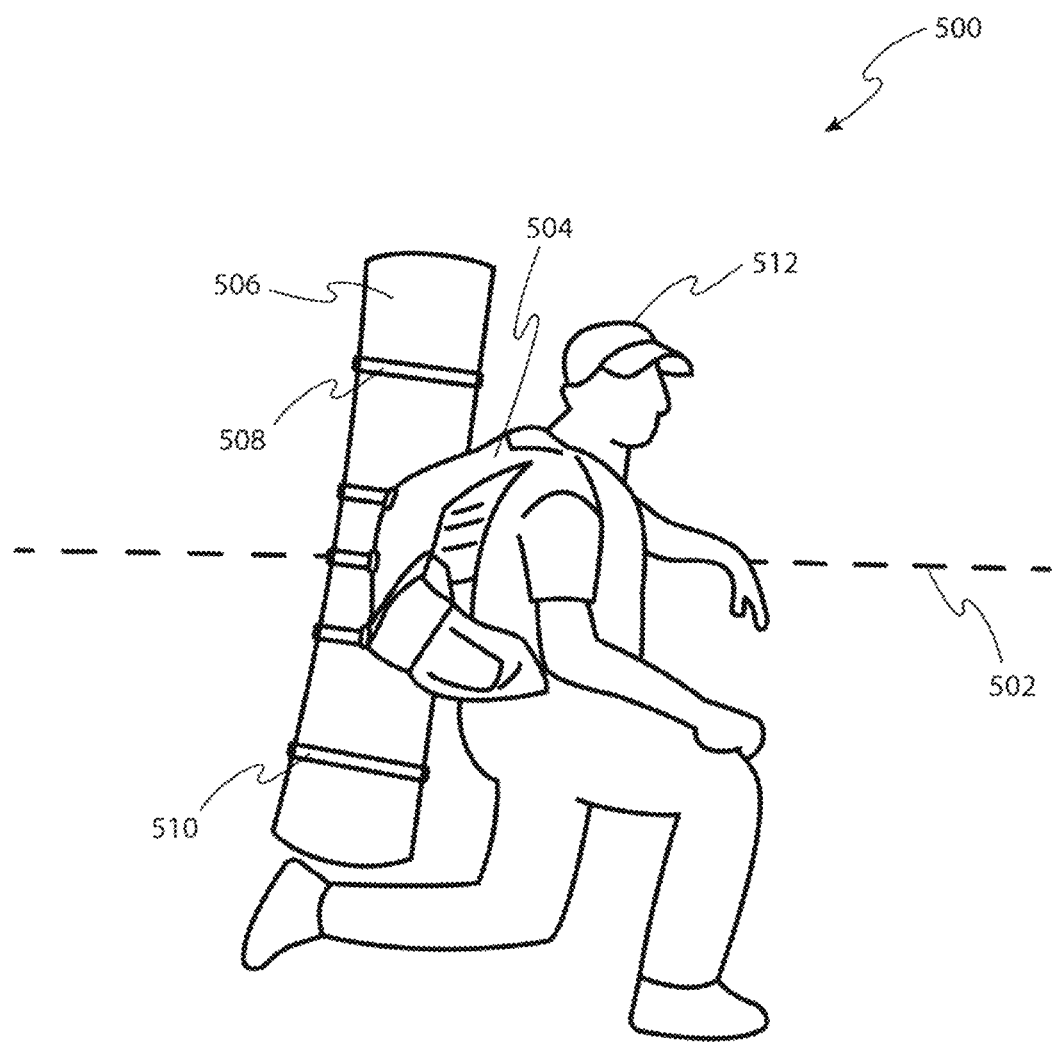
FIG. 5 is an illustration showing the portable hunting blind shown in FIG. 1 rolled up and attached to a backpack, according to preferred embodiments.

FIG. 5 is an illustration 500 showing the portable hunting blind 506 shown in FIG. 1 rolled up and attached to a backpack, according to preferred embodiments. As shown, the blind 100 preferably comprises side material that can be rolled up. Straps 508 and 510 may be used to hold the rolled up blind 506 in a roll. Straps integral to backpack 504 may be used to attach the rolled up blind 506 to the backpack 504. And hunter 512, shown leaning on a surface 502, may then easily carry the collapsed, rolled up blind 506 from location to location. The rolled up blind 506 includes the side material and supporting rods shown in FIGS. 3 and 4, and preferably weighs approximately 4 lbs. The optional cover 204 shown in FIG. 2 and a number of additional securing stakes may also be included in the rolled up blind 506.

Figure 6:
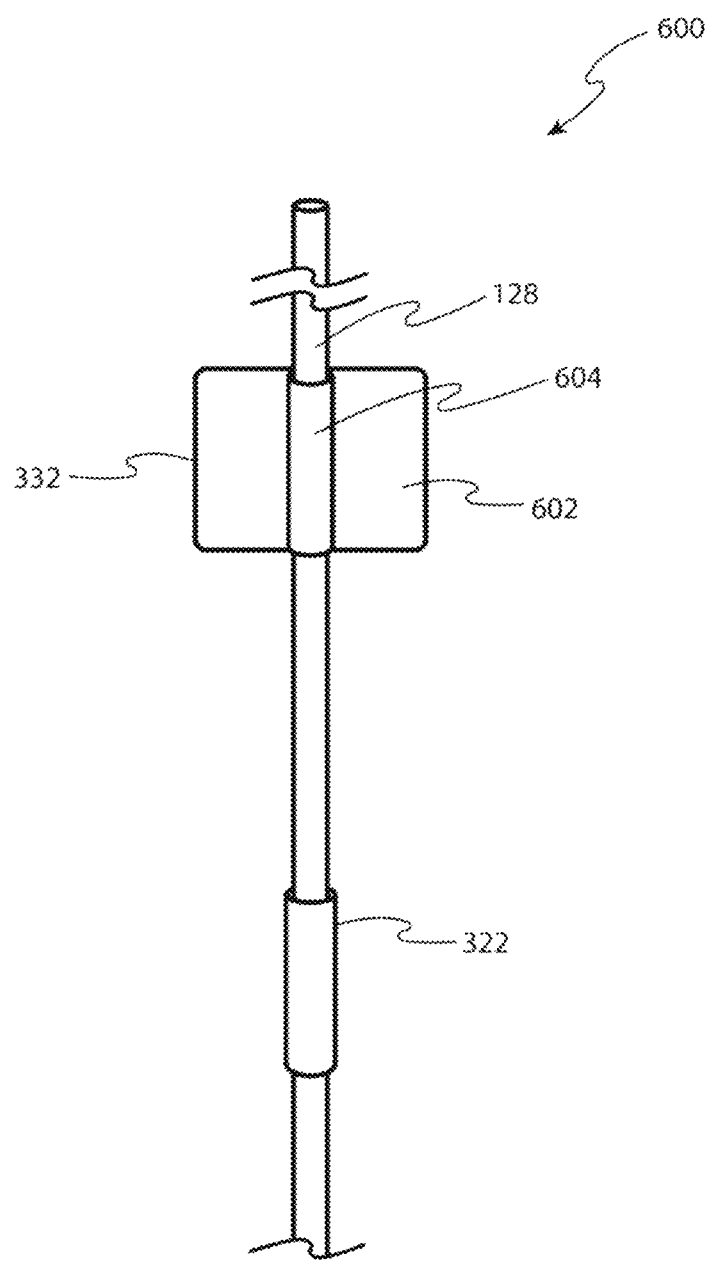
FIG. 6 is an illustration of an upper portion of a rod component of the portable hunting blind in FIG. 1, according to preferred embodiments.

FIG. 6 is an illustration 600 of an upper portion of a rod component of the portable hunting blind in FIG. 1, according to preferred embodiments. The support rod 128 preferably includes a wrap 604 of hook and loop fastener that fastenably secures with a patch 602 of hook and loop fastener adhered to the inside surface of the interior side 300, as shown in FIG. 3. The support rod 128, in preferred embodiments, is slideably and removably retained by the upper tube 322 (and, shown in FIG. 7, the lower tube 358).

Figure 7:
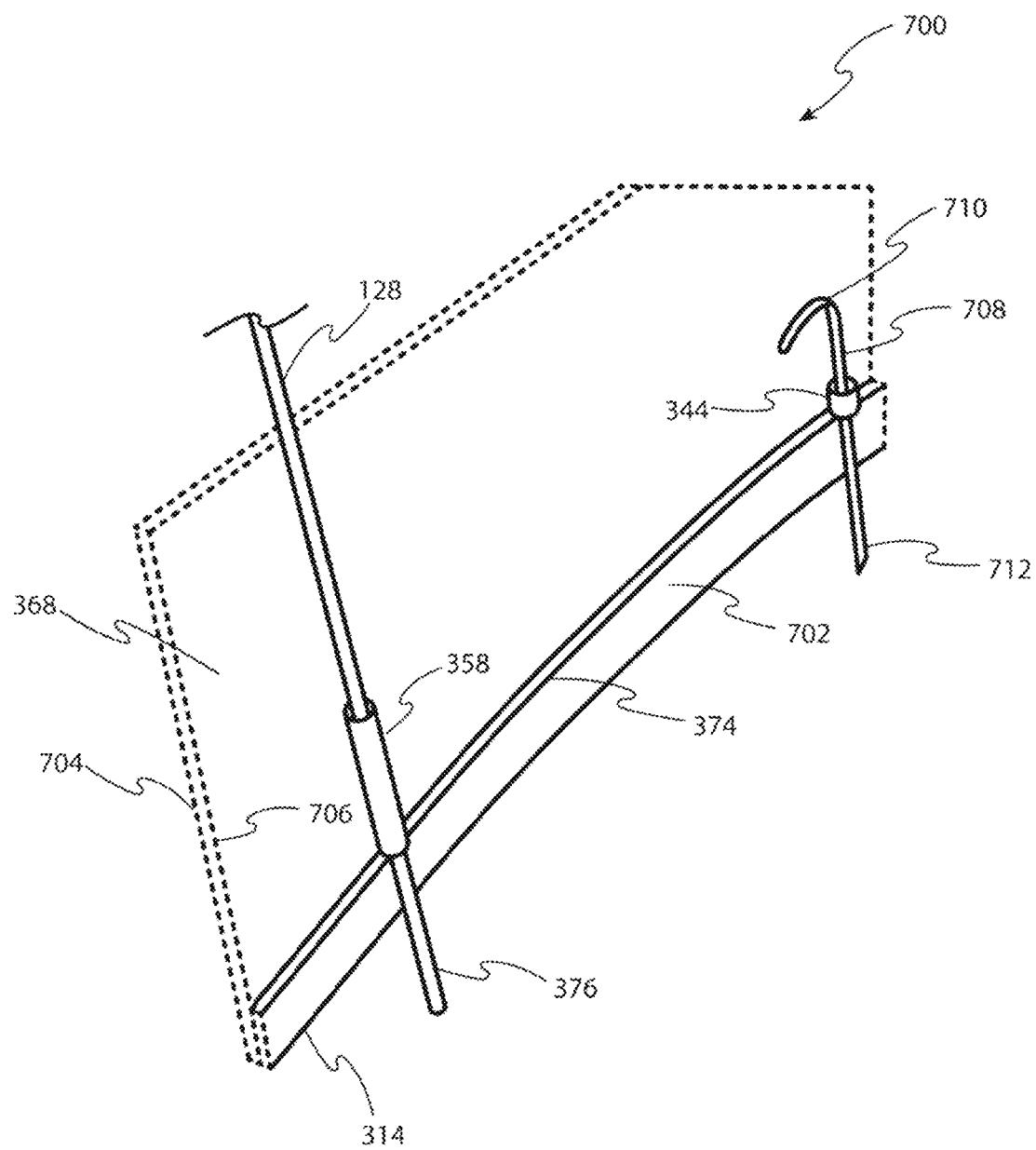
FIG. 7 is an illustration of a lower portion of an interior side of the portable hunting blind in FIG. 1, according to preferred embodiments.

FIG. 7 is an illustration 700 of a lower portion of an interior side of the portable hunting blind in FIG. 1, according to preferred embodiments. When the support rod 128 is moved downward (by detaching/unfastening the wrap 604 hook and loop fastener from its corresponding patch 602), the lower end 376 of the rod 128 extends downward below the lower edge 314 of the blind. As previously described, the lower tube 358 is preferably adhered to the interior surface 368 and positioned just above the upper edge 374 of the turned up edge 702. Also as previously described, the stake down tube 344 is preferably adhered to the interior surface 368 and positioned just above the upper edge 374 of the turned up edge 702. A stake 710 (such as a 9 inch aluminum tent stake) is preferably used, as shown, to secure the lower edge of the blind by driving the stake 710 through the stake down tube 344 so that the stake's lower end 712 is driven downward below the lower edge 314 of the blind.

Figure 8:
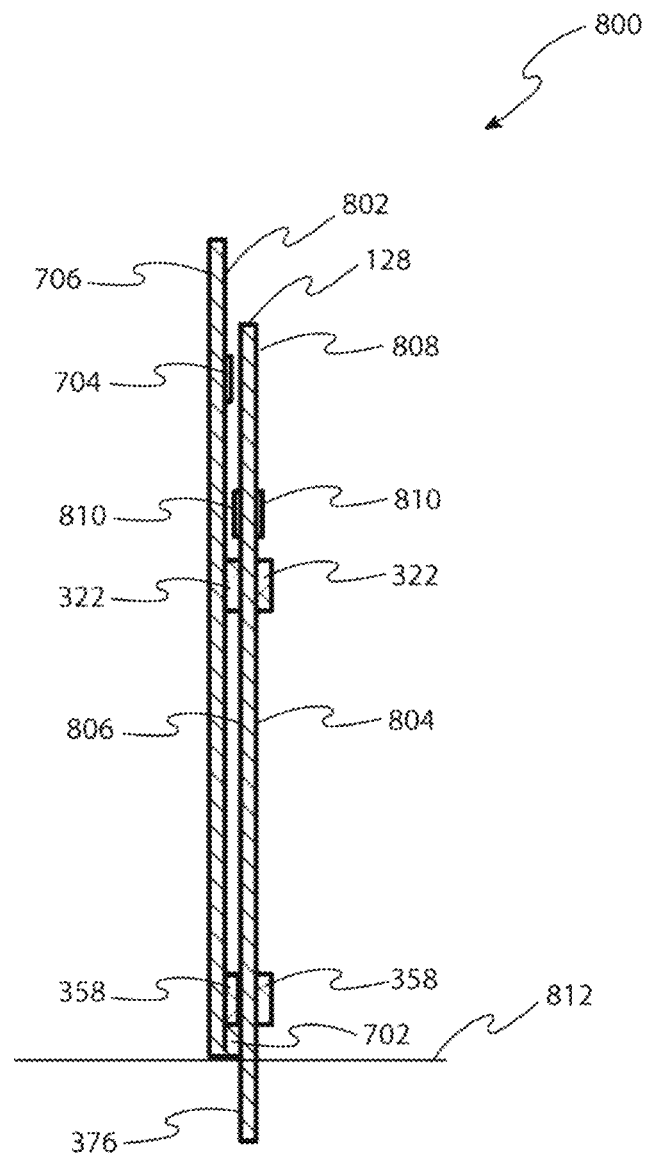
FIG. 8 is a cross-section through a side material and rod component of the portable hunting blind in FIG. 1, according to preferred embodiments.

FIG. 8 is a cross-section 800 through a side material 802 and rod 128 component of the portable hunting blind in FIG. 1, according to preferred embodiments. The thickness 704-706 of the side material 802 is preferably consistent throughout, and the thickness of the turned up portion 702 is preferably the same thickness 704-706. As shown, the support rod 128 in a downward position 808 with its wrap of hook and loop fastener 810 detached from a corresponding patch of hook and loop fastener 602 so that the rod 128 has been slid downward through upper tube 322 and lower tube 358 and the lower end of the rod 376 is shown penetrating the ground/surface level 812. The support rod 128 preferably comprises a rod substantially the length that is the same as the height 108-110 of the side material 802 and a thickness/diameter 804-806 of about ¼ to 5/16 inch. Each rod is preferably comprised of fiberglass, for strength and durability.

The present inventor discovered that the side material 802 preferably comprises a 5 mm think aluminum foil EPE closed cell foam construction. In other embodiments, the thickness 704-706 of side material 802 is preferably between 2 mm and 10 mm. In other embodiments, the side material 802 may comprise EPE closed cell foam (for better thermal insulating properties) or EVA (ethylene vinyl acetate) (for better durability) or EPP (expanded polypropylene). In some embodiments, the side material 802 may comprise EPE closed cell foam with aluminum foil laminated on both interior and exterior sides (with the exterior coated with a camouflage pattern and the interior upper portion coated with a dark or black color).

Figure 9:
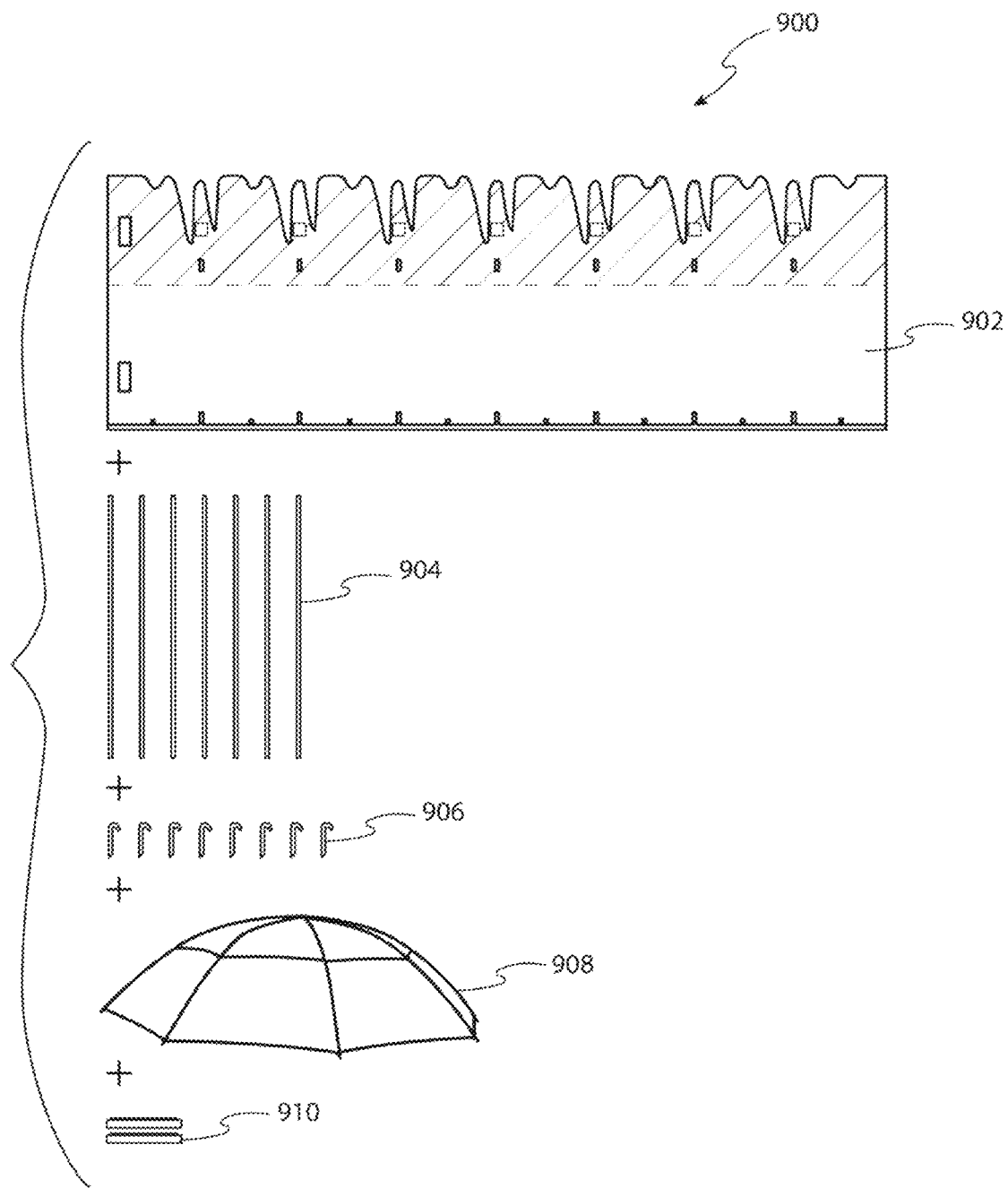
FIG. 9 illustrates a kit of components comprising a portable hunting blind, according to preferred embodiments.

FIG. 9 illustrates a kit of components 900 comprising a portable hunting blind, according to preferred embodiments. The kit preferably includes a side material component 902 comprising the interior and exterior side in FIGS. 3 and 4 without the supporting rods 128 in place; plus a plurality of support rods 904; plus a plurality of stakes 906; plus an optional cover or umbrella 908; and optionally a pair of straps 910 for securing the blind when rolled up. In a preferred embodiment, the kit 900 comprises a side material component 902, seven support rods 904, and eight stakes 906. In another embodiment, the kit 900 comprises a side material component 902, seven support rods 904, eight stakes 906, a cover 908, and two straps 910.

Figure 10:
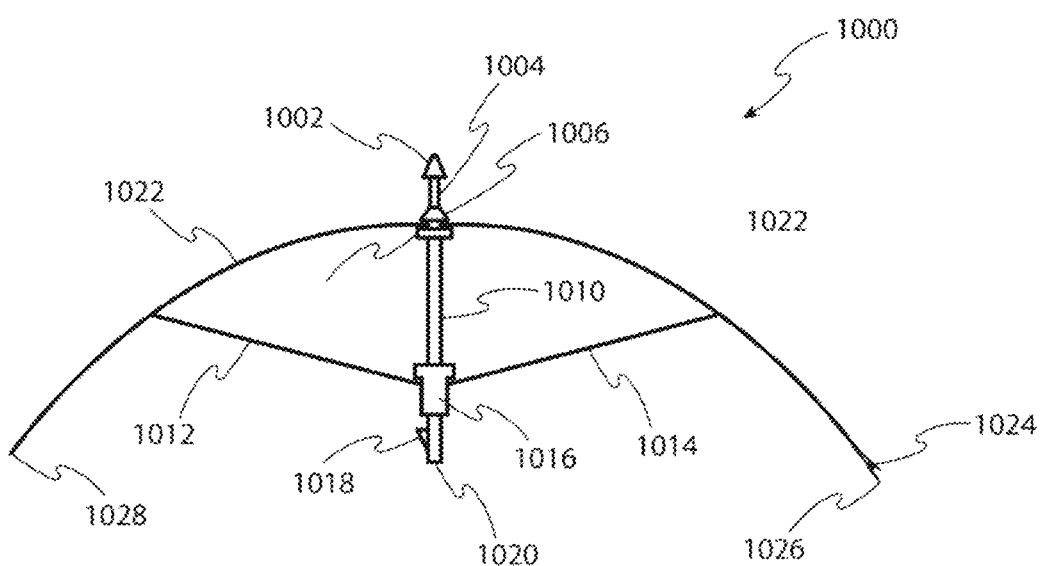
FIG. 10 depicts a cross-section of an optional cover for a portable hunting blind, according to preferred embodiments.

FIG. 10 depicts a cross-section of an optional cover 1000 for a portable hunting blind, according to preferred embodiments. The cover 1000 preferably comprises a modified umbrella having a camouflage pattern 1022 thereon. As shown, a cover 1000 may comprise an umbrella with a cut off shaft 1020. Depressing the spring 1018 allows the runner 1016 to slide off the cut end of the shaft 1020 opposite the tube 1010, whereby the stretchers 1012 and 1014 follow the runner downward to fold the covering material (with camouflage pattern) 1022 downward into a collapsed and stowable configuration, similar in size with an unmodified collapsed umbrella. The cap 1006, end 1004, and ferrule 1002 components are shown for reference to similar components of an umbrella. In preferred embodiments, tips 1028 and 1026 may include a clip 1024 for holding the tip of the cover to a top edge of the blind, such as to top edge 316 shown in FIGS. 3 and 4. In preferred embodiments comprising a cover such as cover 1000, three clips such as clip 1024 are equally spaced (at 120 apart from one another) around the cover for securing a lower edge or tip of the cover to an upper edge of the blind side material.

Figure 11:
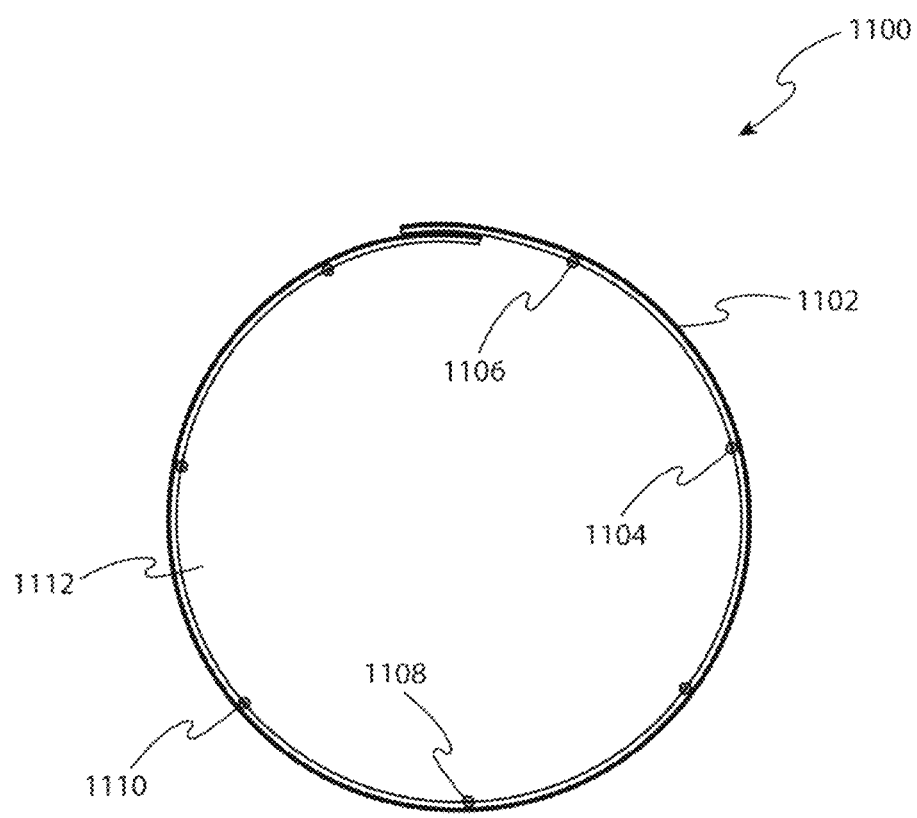
FIG. 11 is an overhead view of an assembled substantially circular configuration of a portable hunting blind, according to preferred embodiments.
Figure 12:
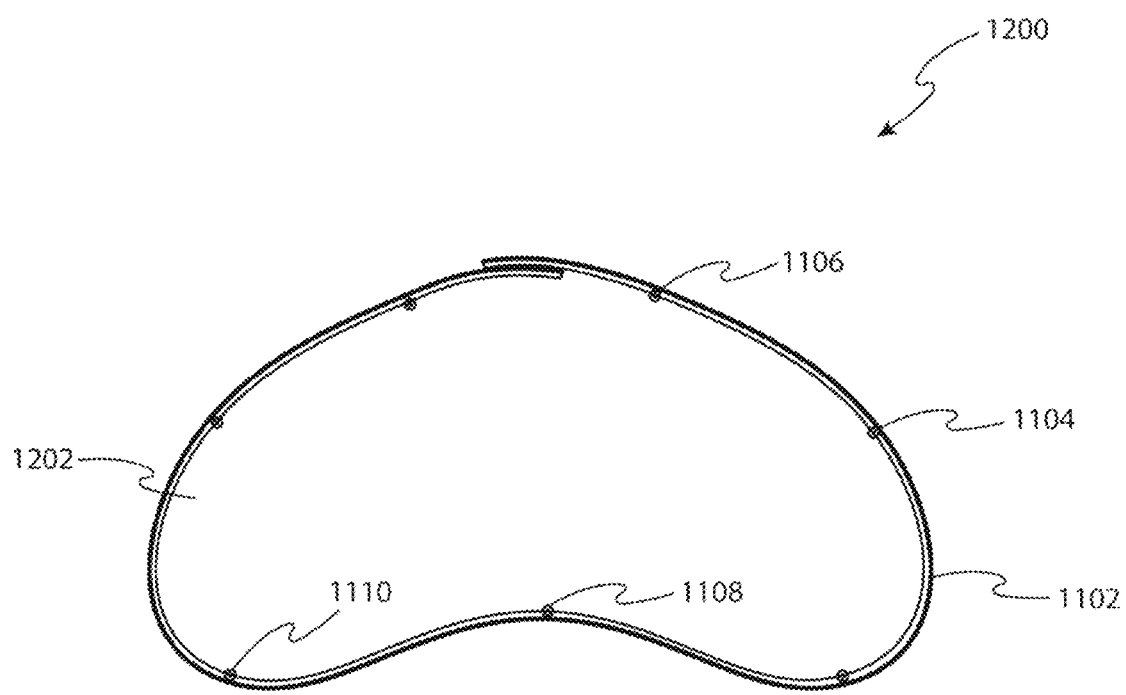
FIG. 12 is an overhead view of an assembled irregularly shaped configuration of a portable hunting blind, according to preferred embodiments.

FIG. 11 is an overhead view of an assembled substantially circular configuration 1100 of a portable hunting blind without a cover, according to preferred embodiments. The side material shown in FIG. 1 may be configured substantially as shown in FIG. 11 so that the side material is oriented in a circle, creating a circular area 1112 enclosed by the side material 1102. Particular support rods 1106, 1104, 1108, and 1110 are shown for reference and comparison with respect to FIG. 12, which is an overhead view of an assembled irregularly shaped configuration 1200 of a portable hunting blind, according to preferred embodiments. The support rods are shown repositioned from where they were in FIG. 11 so as to create an irregular interior area 1202 that is different than the area 1112. The blind side material 1102 is preferably reconfigurable into any shape, so that the blind may be oriented to accommodate a desired interior footprint or avoid a particular obstacle or obstruction such as a tree or rock or particular vegetation.

Figure 13:
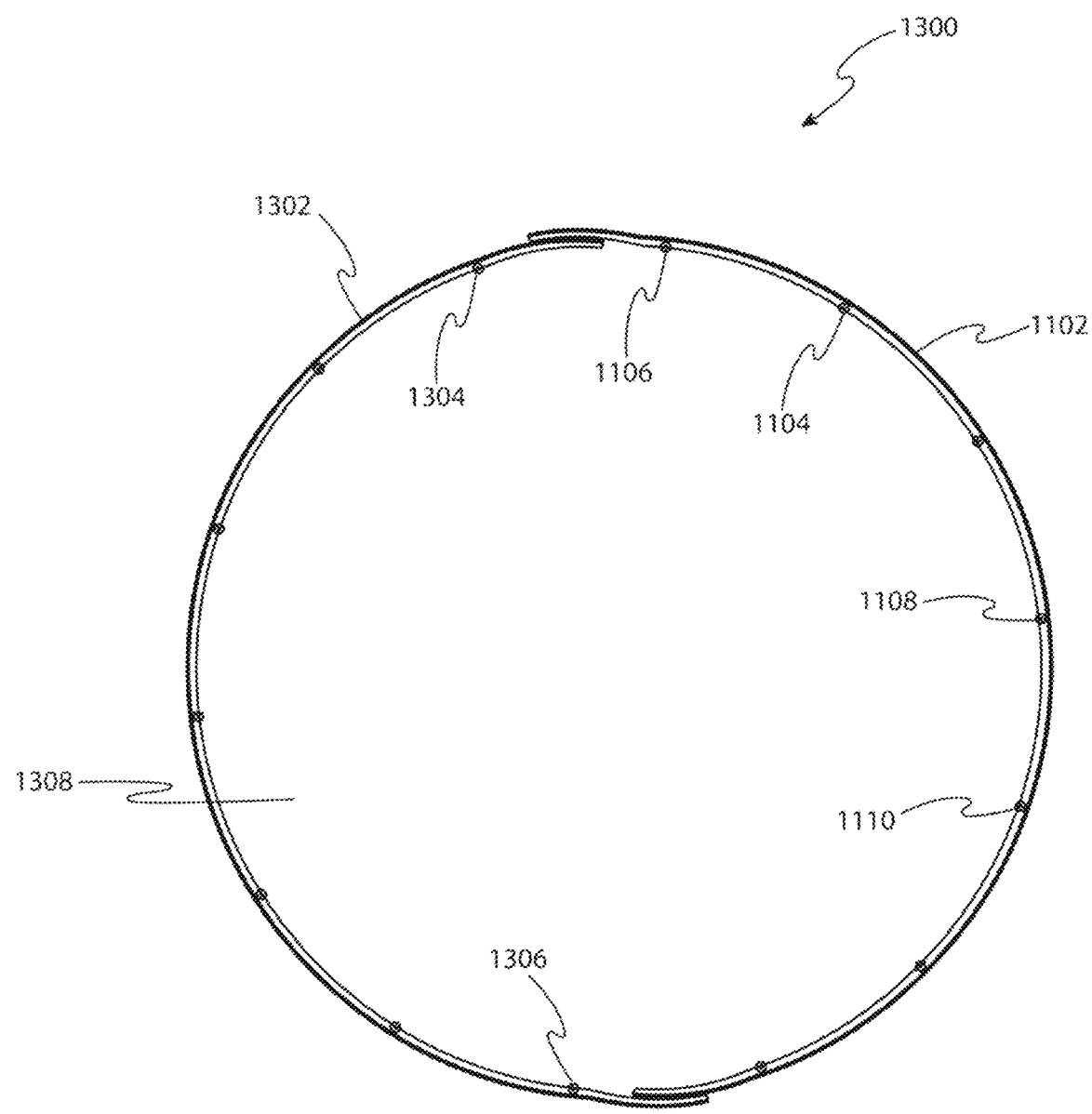
FIG. 13 is an overhead view of two blinds interconnected with one another in an assembled substantially circular configuration, according to preferred embodiments.
Figure 14:
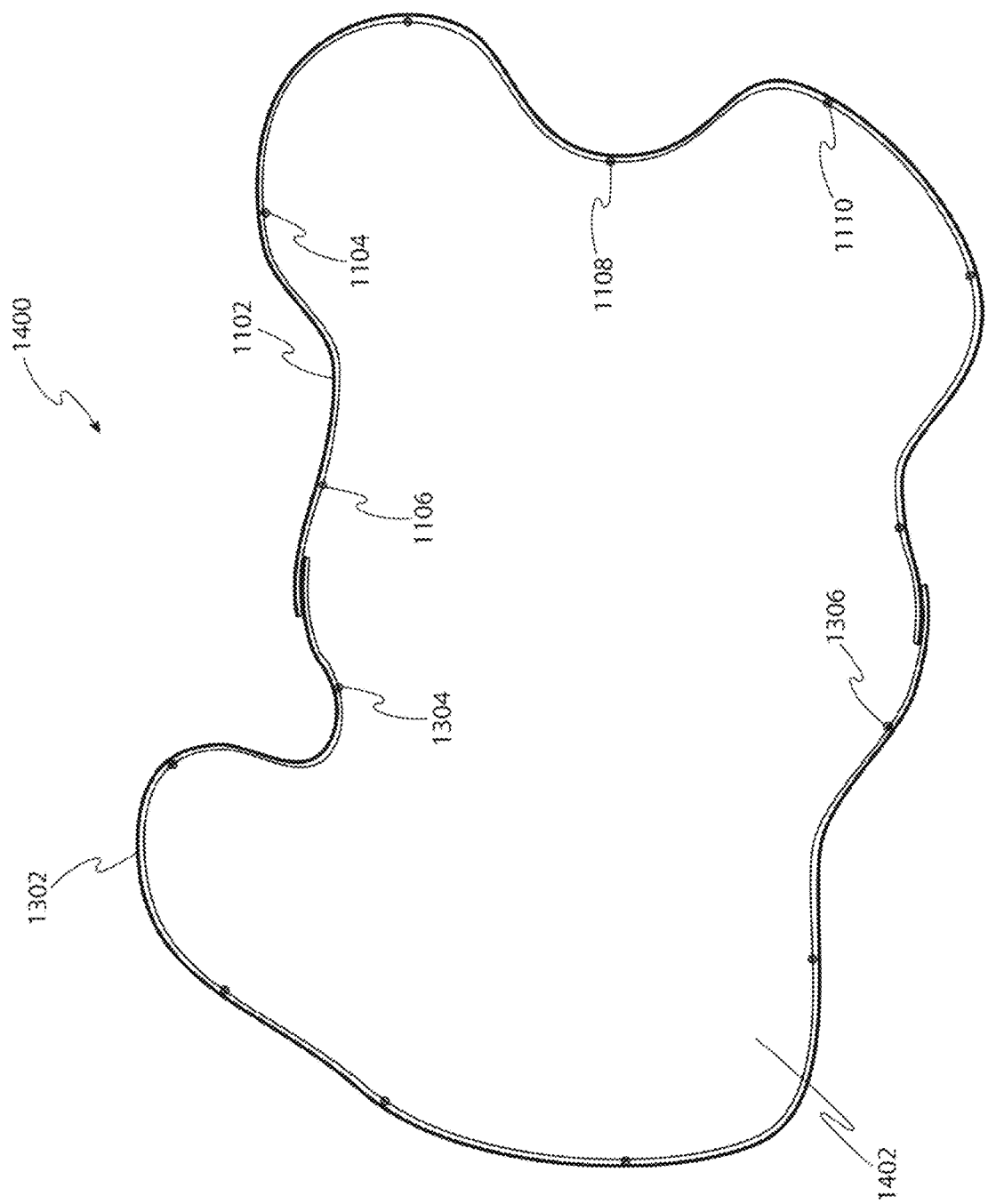
FIG. 14 is an overhead view of two blinds interconnected with one another in an assembled irregularly shaped configuration, according to preferred embodiments.

FIG. 13 is an overhead view of two blinds interconnected with one another in an assembled substantially circular configuration 1300, according to preferred embodiments. Side material 1102 of a first blind is shown interconnected with the side material 1302 of a second blind (such as by using the loop and hook fasteners of one blind 1102 with correspondingly mating loop and hook fasteners of the second blind 1302). A circular interior space 1308 is created by arranging both blinds connected together into a large circle. And the support rods 1106, 1104, 1108, 1110, 1306, and 1304 are shown for reference and comparison with respect to FIG. 14, which is an overhead view of two blinds interconnected with one another in an assembled irregularly shaped configuration 1400, according to preferred embodiments. The support rods are shown repositioned from where they were in FIG. 13 so as to create an irregular interior area 1402 that is different than the area 1308. The blind side material 1102 and 1302 of the two blinds may be combined and oriented to accommodate a desired footprint or to avoid particular obstacles or environmental condition such as rocks or water or changes in slope.

In preferred embodiments, using the described portable hunting blind comprises unrolling the sheet of semi-rigid side material, arranging the side material in an upright orientation upon the ground or surface underneath to form a closed shape suitable for concealing a hunter within an interior space surrounded by said side material, and pushing downward at least one of the plurality of rod supports which are adapted to support the semi-rigid side material to anchor the side material to the surface underneath. The ends of the of the side material may further be secured using fasteners incorporated into correspondingly mating ends of said side material (such as the hook and loop fasteners, or alternative fastening means), and using one or more stakes to further secure the lower turned up edge of said side material.

To tear down and stow the blind or carry the blind to another location, the hunter preferably pulls upward the rod supports anchoring the side material to the ground underneath, rearranges the side material to lay flat on the ground, and then rolls up the sheet of side material along with the rod supports, and also the optional additional stakes and optional cover/umbrella, into a roll, and uses a couple of straps to secure the rolled up blind.

Figure 15:
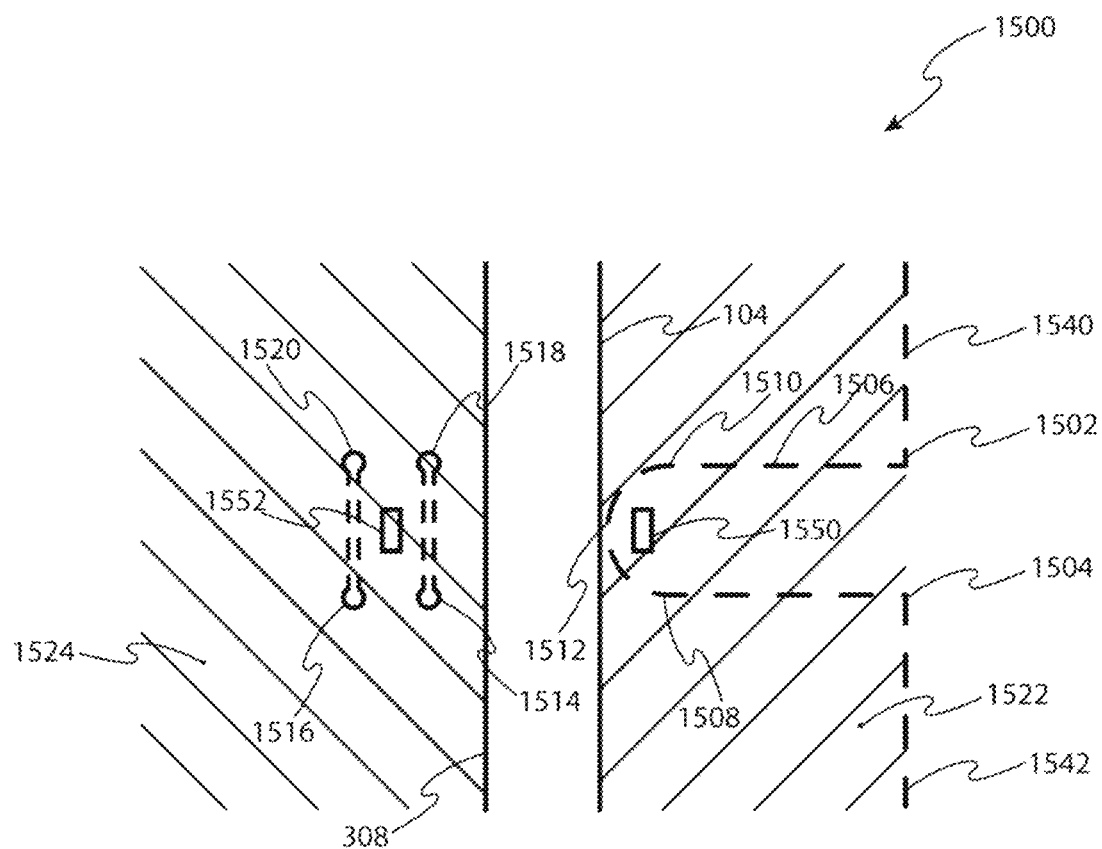
FIG. 15 depicts a strap and corresponding slots for connected ends of a portable hunting blind, according to preferred embodiments.

FIG. 15 depicts a strap 1506 and corresponding slots 1518-1514 and 1520-1516 for connected ends 308 and 104 of a portable hunting blind, according to preferred embodiments. The present inventor discovered alternatives to closing the blind 100 (or securing the two ends of the blind 100, or interconnecting the ends of a first blind with the ends of a second blind) using other than the loop and hook fasteners 336, 338 (in FIG. 3) and 404, 402 (in FIG. 4) preferably include cutting a strap 1506 from an end 104 of the blind and cutting slots 1518-1514 and 1520-1516 into the end 308 of the blind. Each slot is preferably bounded by a hole. For example, the slot 1520-1516 is preferably created by forming a ⁵⁄₁₆ inch hole at 1520 and another ⁵⁄₁₆ inch hole at 1518, and connected the two with a ⅛ inch wide channel. The slot 1518-1514 is preferably formed in the same manner.

The strap 1506 preferably comprises cutting along 1540 to a point 1502, and similarly cutting along 1542 to a point 1504; then cutting to a radius starting at 1508 and ending at 1512; and likewise cutting from 1502 to a radius starting at 1510 and ending at 1512. Hook and loop fasteners 1550 and 1552 are preferably positioned and adhered to the interior side material surfaces 1522 and 1524 as shown. The resulting strap 1506 is preferably about three inches wide to match the approximate lengths of slots 1518-1514 and 1520-1516. The slots are preferably three inches apart from one another (i.e. 1516-1514 and 1520-15-18 are each about three inches), and the strap 1506 is preferably long enough to thread through the two slots and fold over so that the hook and loop fasteners 1550 and 1552 can be connected with one another.

Figure 16:
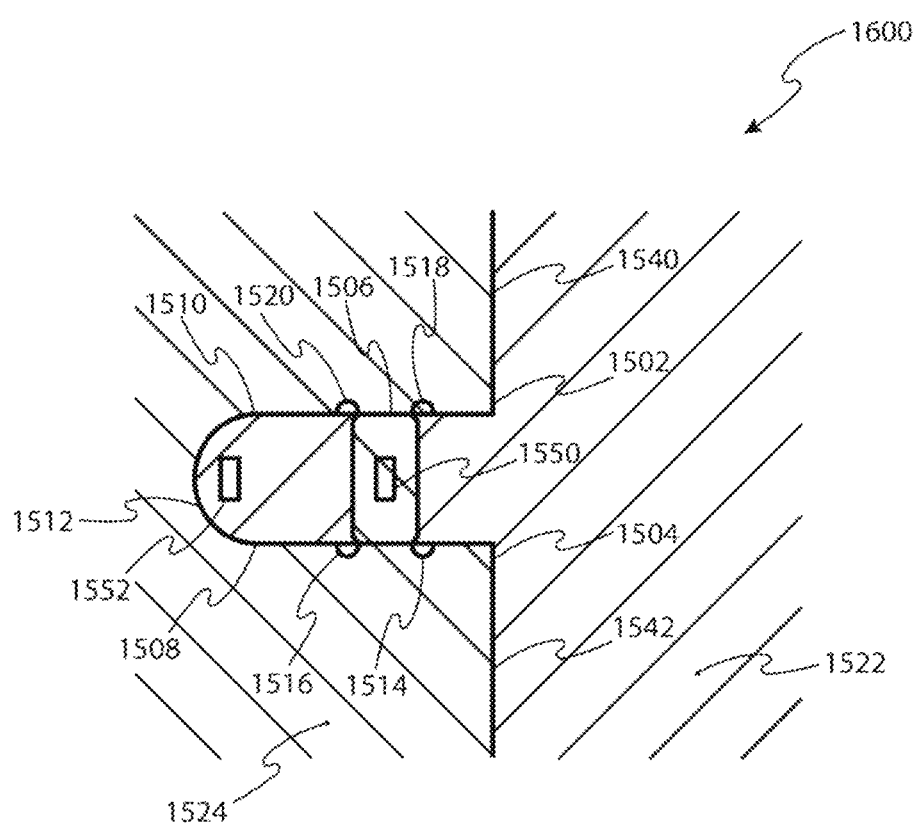
FIG. 16 depicts the strap and corresponding slots shown in FIG. 15 in a closed orientation, according to preferred embodiments.

FIG. 16 depicts the strap 1506 and corresponding slots shown in FIG. 15 in a closed orientation with the end of the strap 1506 not yet folded over to connect the fastener 1552 (on the end of the strap 1506 on material surface 1522) with the fastener 1550 (between the two slots on material surface 1524), according to preferred embodiments. In some embodiments, more than one strap 1506 may be used on end 104 of the blind, along with more than one set of corresponding slots in the other end 308.

Figure 17:
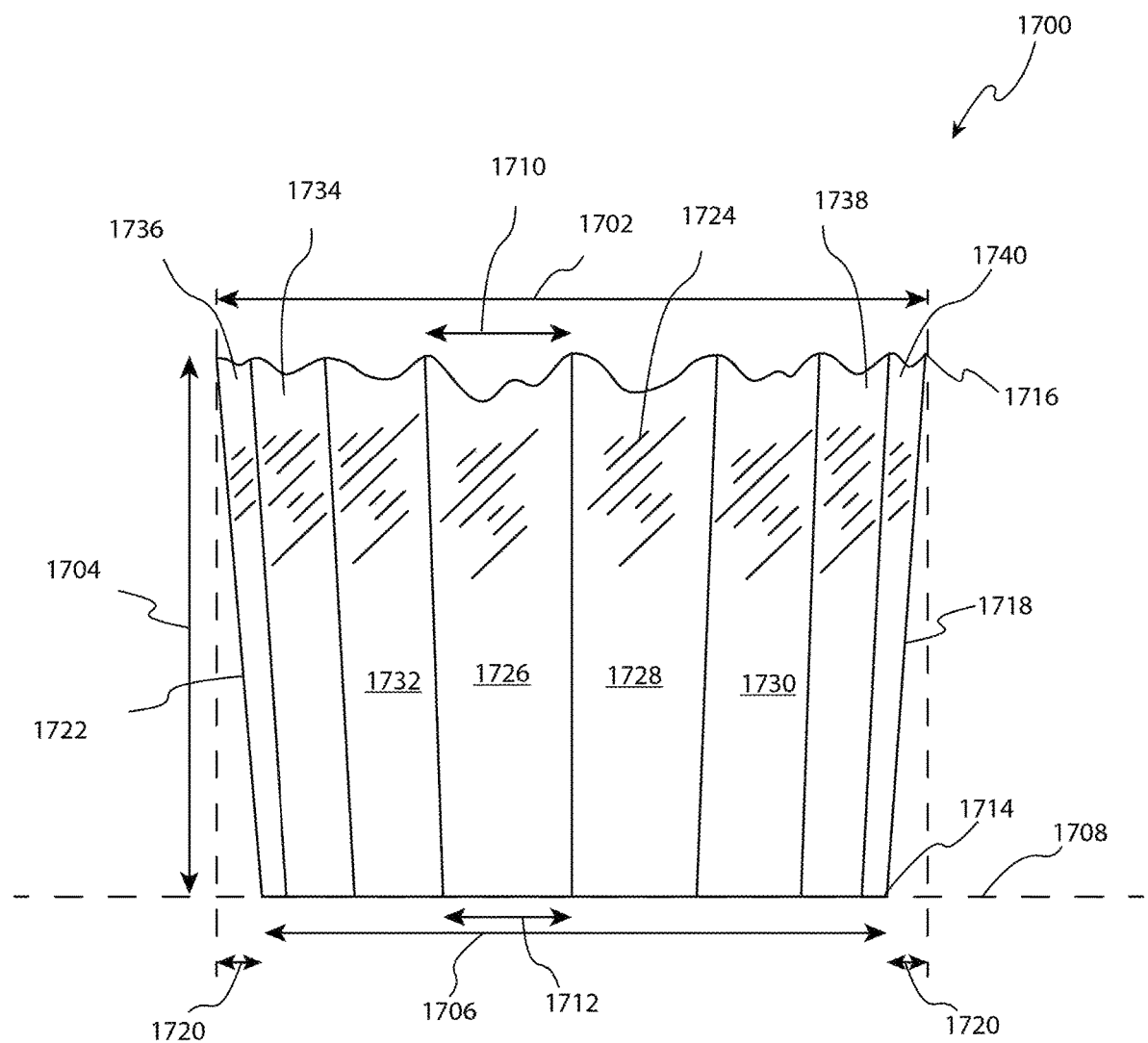
FIG. 17 is a side view of a portable hunting blind having a plurality of panels, according to embodiments.

FIG. 17 is a side view 1700 of a portable hunting blind having a plurality of panels, according to embodiments. The plurality of panels may comprise, as shown, a blind comprising sixteen (16) substantially flat panels that may be attached to one another along vertical extending edges, with each panel having a contoured top edge, and, when positioned standing upright upon a ground/surface, may be oriented and closed so as to enclose an interior space within which a hunter may sit. A different number of panels may be used. However, the present inventor discovered that a blind comprising enough panels so as to, when connected side-by-side with one another, encircle a surface area upon the ground and create side walls that angle outward from a slightly smaller bottom circumference (and diameter) to a slightly larger top circumference (and diameter), provides additional structural support, as well as providing a downward angle when viewed from the exterior of the sidewalls of the blind. The present inventor discovered that the small outward angle, where the top edge of the blind side walls extend radially outward over the bottom edge of the blind side walls, permits improved camouflage characteristics for the assembled blind. The present inventor discovered that covering each panel exterior with a reflective mirror surface finish, in combination with the downward angle so that the exterior panel surface reflects a portion of the ground when viewed from positions on the ground radially away from the blind, permits the blind to hide or camouflage a hunter situated inside the blind (inside the enclosed side walls).

Although other dimensions may be used, and other proportions of the component dimensions may be used, the present inventor discovered that the described dimensions and proportions of such dimensions as compared to one another, whether mathematically explicitly described or computable in view of the examples shown and described herein, are preferred.

The blind shown in the side view of FIG. 17 comprises sixteen substantially flat panels, each having a top width 1710 and a bottom width 1712. The blind may be, for example, unfolded and situated as shown in FIG. 17, in a circle. The side view 1700 will, therefore, only allow a portion of the sixteen panels to be seen from a given side. The blind in FIG. 17 is shown oriented so that the vertical edge between the center panels 1726 and 1728 are centered in this view; and each panel comprises substantially the same width and height dimensions. Thus, eight panels are viewable from the side shown in FIG. 17, and eight similar panels are hidden and visible from the other side. The eight panels visible in FIG. 17 include, from left to right, panels 1736, 1734, 1732, 1726, 1728, 1730, 1738, and 1740. The panels may vary in dimension from one another. However the present inventor determined panels having the same height and width dimensions allowed for improved (accordion-like) foldability when the panels are connected edge to edge, and cutting/blanking (i.e. manufacturing) each panels is made easier.

As shown, the sixteen panels may be connected edge to edge and positioned so as to form a blind having a top edge diameter 1702, a bottom edge diameter 1706, and height 1704. With each panel having a top edge width (between side edges) 1710 of about 11", and a bottom edge width (between side edges) 1712 of about 10", sixteen panels interconnected side-by-side and arranged as shown in an enclosed circle provides a blind having a top circumference of approximately 176", a bottom circumference of about 160", a top diameter between opposing sides of about 56", and a bottom diameter between opposing sides of about 51" (using the relationship circumference is equal to the number pie times the diameter). The height of the blind, with these width dimensions, is preferably about 46". The side 1718, for example, may extend (along an exemplary vertical edge of the individual panel) between a bottom point 1714 and a top point 1716. The lengths of sides 1722 and 1718 are preferably 46" to 48", which, when oriented with the outward angle as shown, may result in a blind having side walls that are about 46" in height above the ground surface 1708.

Each of the panels preferably comprises a reflective mirror exterior finish 1724. As shown, the top diameter 1702 is preferably larger than the bottom diameter 1712. The difference between the top and bottom diameter dimensions is the difference 1720 or amount that the top edge of the blink overhangs the bottom edges of the blind. The difference 1720, as shown, is the top diameter 1702 minus the bottom diameter 1706, divided by two, or about 5 inches (5") divided by two, or about 2.5 inches. The present inventor discovered that this amount of angle, i.e., this amount of overhang between the top edge and the bottom edge, or this relative proportional amount of overhang, provides sufficient downward reflection from the exterior surfaces of the panels, when viewed by an observer when looking toward the erected blind from a distance outward from the blind side walls, so as to render the blind camouflaged into the colors and textures of the surrounding environment in the immediate vicinity where the blind is set up. In some testing, the present inventor was able to achieve effective visual concealment within medium to light brush such that the concealed occupant of the blind was able to avoid visual detection within just a few yards. That is, the reflective panels arranged as shown in FIG. 17, in the present inventor's testing, provided camouflage that effectively concealed the location of the blind. The reflective mirror finish 1724 on the exterior of each panel effectively mirror back the ground environment proximate to the blind. The downward angle provides the advantage of reflecting more of the ground immediately proximate to the blind as opposed to areas extending outward closer to a viewer, or portions of sky or other unwanted or less desirable reflections.

Although not shown in FIG. 17, the side walls (edge to edge connected panels) shown in FIG. 17 are preferably additionally supported by a number of rod supports as shown and described with respect to FIGS. 6 and 7. Preferably, four (4) rod supports are used, each spaced apart to secure a portion of the circumference of the (set up) blind. A number of stakes may be used as shown and described with respect to FIG. 7, to further secure the lower/bottom edges of the blind. Preferably, four (4) stakes are used, each spaced apart within the interior/inner sides of the blind. As mentioned, aspects and features of the rollable blind described in FIGS. 3, 4, 6, 7, and 8 may be included with the reflective panel-based blind illustrated in FIG. 17. Further, as shown in FIGS. 2 and 10, the embodiment shown in FIG. 17 may be coupled/combined with an optional cover. As for all the embodiments described, the blind in FIG. 17 may comprise a kit of items/components as shown in FIG. 8, with such a kit comprising the interconnected, accordion foldable, reflective panel side wall material (shown in FIG. 17), plus four rods 904, four stakes 906, and optional cover 908, and optional straps 910 or a bag (not shown) for stowage of the folded side walls, rods, and stakes (and optional cover).

The side wall (or side material) comprising, for example, the panels as in FIG. 17, are preferably closeable to form the enclosed interior space (within which a hunter may be concealed), using hook and loop fasters, for example, as described with respect to FIGS. 3 and 4. Or the ends may be closed (to form the enclosed space to fully surround and conceal a hunter within the side wall material/panels) using one or more strap and slot structures as described in FIG. 15. Further, two or more blinds having interconnected panels as in FIG. 17 may be interconnected to one another similar to the interconnected blinds shown and described in FIGS. 13 and 14.

Figure 18:
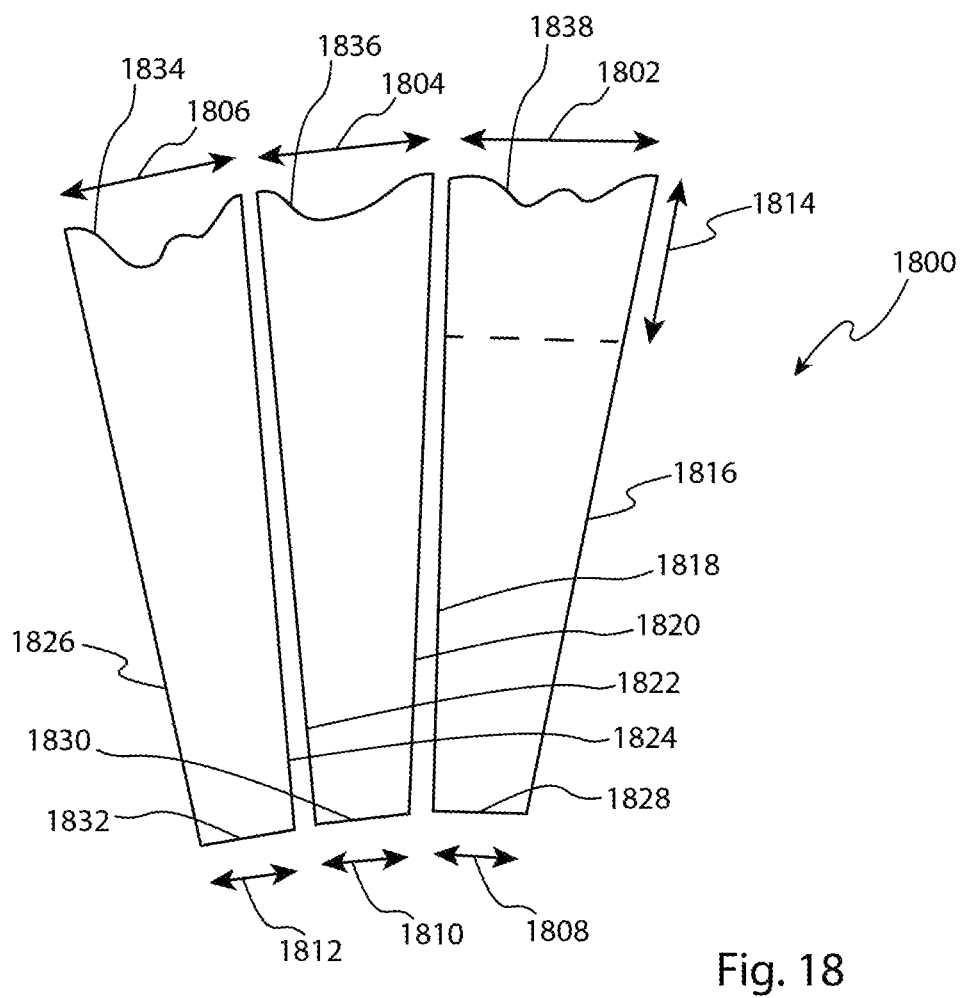
FIG. 18 is an illustration of three exemplary panels of the blind in FIG. 17, according to embodiments.

FIG. 18 illustrates three exemplary panels 1800 of the blind in FIG. 17, according to embodiments. Preferably the reflective panel-based blind shown in and described with respect to FIG. 17 comprises sixteen panels. However, as mentioned, the number of panels may be different. FIG. 18 shows three panels in greater detail, according to preferred embodiments. Each panel is preferably similarly sized, with top edge widths 1806, 1804, and 1802 and respective bottom edge widths 1812, 1810, and 1808 for the panels 1726, 1728, and 1730, respectively. Preferably, each panel comprises a pair of side edges extending from a bottom edge and a top edge. Preferably, the height dimension of each panel is largest at the side edges, and the top edge contours for each panel includes troughs or valleys extending downward from the peaks at each edge. As shown, panel 1726 comprises right and left side edges 1826 and 1824, respectively. The height of panel 1726 ranges from the length of 1826 between bottom edge 1832 and the peak of the contour/top edge 1834. As shown, the contour 1834 decreases to form at least one valley or trough between the edges 1826 and 1824. The trough or contours are preferably the same or similar to the troughs described with respect to FIG. 1. Preferably, at least one trough in the top edge of each panel comprises a shape adapted for resting the barrel of a hunter's gun. Each of the top contours 1834, 1836, and 1838 comprise at least one trough adapted for resting the barrel of a gun.

Each panel, such as panel 1730, is made of a backing material such as a compressed plastic. The compressed plastic may be ⅛ to 3/16 inch thick. The panel, such as panel 1730 is preferably cut to shape, cutting the side edges 1816 and 1818, the bottom 1828, and the top contour edge 1838. Reflective mirror material (such as an adhesive backed mirror finish film) is preferably adhered to the exterior side of each panel. On the reverse side (or inside of the blind enclosure when set up), extending from the top edge downward a vertical height 1814, is preferably a camouflage pattern such as described for the exterior of the embodiments shown and described with respect to FIG. 1. This interior side camouflage pattern (as opposed to the exterior reflective mirror finish), the present inventor determined, provides camouflage of the hunter sitting inside the blind, so that the hunter is better concealed at viewing angles over the top edge and/or top contour (troughs) of the blind.

Adjacent panels are preferably connected via a flexible adhesive strip or high strength adhesive strip that extends between the vertical edges of the adjacent panels. For example, edges 1818 and 1820 (for the adjacent panels 1730 and 1728, respectively) may be flexibly joined together using flexible plastic or flexible adhesive strip material, so as to form a joint between the adjacent panels. Likewise, edges 1822 and 1824 for the adjacent panels 1728 and 1726, respectively, may be flexibly joined with an adhesive strip to form a flexible joint.

Figure 19:
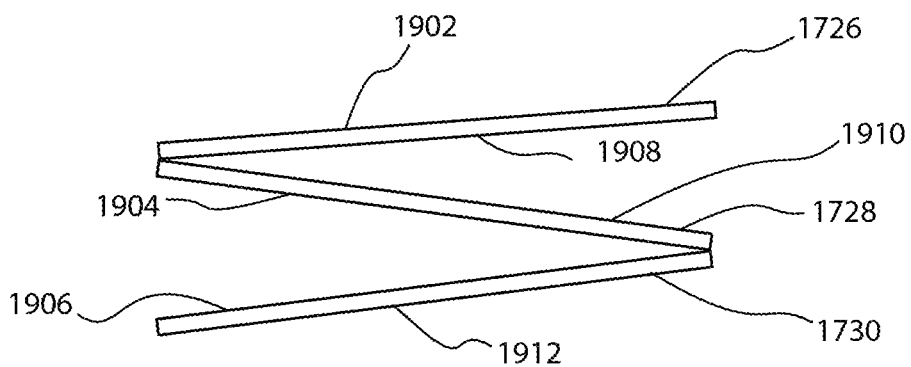
FIG. 19 is an illustration of the three panels in FIG. 18 foldably collapsible in an accordion fashion, according to embodiments.

Next, FIG. 19 illustrates the three panels 1726, 1728, and 1730 foldable in an accordion fashion, according to embodiments. For example, the three panels are preferably folded in an accordion fashion with respect to one another such that pairs of adjacent surfaces are alternatingly facing each other and then opposed to one another. The reflective exterior surface 1902 of panel 1726 and the reflective exterior surface 1904 of adjacent panel 1728 are opposed to one another, and then the reflective exterior surface 1904 of panel 1728 is facing the reflective exterior surface 1906 of adjacent panel 1730. In similar fashion, the interior surface 1908 of panel 1726 and the interior surface 1910 of adjacent panel 1728 are facing one another, and then (in an alternating manner) the interior surface 1910 of panel 1728 and the interior surface 1912 of the adjacent panel 1730 are opposed to one another. In such a way, the panels fold up together in an accordion-like manner, as illustrated in FIG. 19. The joint material (not shown) between adjacent panels is preferably oriented and adapted (and has enough flexibility) so as to permit adjacent panels to fold flat against one another. FIG. 19 shows only three panels of, preferably, a combination of multiple panels. In preferred embodiments, sixteen panels such as panels 1726, 1728, and 1730, comprise the panel-based blind, and are foldable in an accordion-like manner into a flat "stack" of folded panels.

For deployment of the blind, the stack of folded panels are unfolded with the base of each panel set upon a ground surface; the panels are openably arranged so as to form an enclosed blind comprising the edge-joined reflective panels; the two open ends (i.e. the panel edges not having another joined panel) are then closeable (such as using a hook and loop type closure) to form the enclosed interior space where a hunter is able to sit; rod supports retainable within the interior side walls of the panels are then pushed downward into the ground for securing the blind side panel material; and stakes are used to further secure the bottom edge of the side panel material to the ground. Taking down the blind may comprise the reverse steps described above for deployment, and, with the panels folded into an accordion-like stack, optionally using one or more straps to secure the folded stack, or placing the folded stack into a stowage bag.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A portable hunting blind comprising:
   a plurality of flat semi-rigid or rigid panels, each panel having a bottom edge and a top edge with side edges extending therebetween, wherein each panel is foldably attached to an adjacent panel, and, when unfolded from one another, the unfolded panels are sized and adapted to be positionable with the side edges in an upright orientation upon a ground surface underneath to form a closed shape with the bottom edges upon the ground surface, the closed shape for concealing a hunter within an interior space of the blind surrounded by the unfolded panels;
   the top edges of the panels formed to include troughs of varying depth and shape to provide an improved camouflage characteristic for the top edges of the unfolded panels, the top edges of the unfolded panels having at least one trough adapted to provide support for resting the barrel of a gun, wherein a height dimension of each panel is largest at the side edges so that the troughs extend downward from peaks at each side edge; and
   the top edge of each panel formed to be longer than the bottom edge of the panel so that when the unfolded panels are positioned in the upright orientation upon the surface to enclose the interior space, exterior surfaces of the panels facing away from the interior space are angled downward so that reflective material comprising the exterior surfaces of the panels reflect a greater portion of the ground upon which the blind is positioned than features above the ground.

2. The hunting blind of claim 1 wherein the panels are foldably attached to one another so that the panels are foldable in an accordion fashion, with the plurality of panels foldable into an accordion stack of panels.

3. The hunting blind of claim 1 wherein the unfolded panels are adapted to be supported in the upright orientation by a plurality of rod supports.

4. The hunting blind of claim 3 wherein each of the rod supports is adapted to be selectively adjustable downward to stake into the ground beneath the blind for staking the blind into the ground surface.

5. The hunting blind of claim 1 wherein the blind is sized to accommodate within the interior space the hunter with a chair and room for a source of heat and a deodorizer device.

6. The hunting blind of claim 1 wherein the panels comprise material having an approximate height along the side edges of approximately four feet.

7. The hunting blind of claim 1 further comprising a plurality of anchor receptacles through which tent stakes may be used to secure at least one bottom edge of the unfolded panels.

8. The hunting blind of claim 1 wherein the top edge of each panel comprises at least one trough adapted to provide support for resting the barrel of a gun.

9. The hunting blind of claim 8 wherein the at least one trough is positioned between side edges of the panel.

10. The hunting blind of claim 1 wherein a top edge circumferential dimension and top edge diameter of the blind when positioned in the upright orientation enclosing the interior space is larger than a bottom edge circumferential dimension of the blind so that outward facing reflective side surfaces of the unfolded panels are angled downward, the downward angle providing an improved camouflage characteristic for the blind by reflecting more of the ground surface than features above the ground surface.

11. A portable hunting blind comprising a plurality of panels that, when connected side-by-side with one another, are positionable in an upright orientation upon a ground surface to form a closed shape, the closed shape encircling a surface area upon the ground surface sized to accommodate a hunter sitting within the surface area and an interior space enclosed by the panels, the panels forming a top edge of the enclosed interior space and defining a top edge circumferential dimension and a bottom edge of the enclosed interior space and defining a bottom edge, wherein the top edge circumferential dimension is larger than the bottom edge circumferential dimension, the difference in top edge and bottom edge dimensions providing structural support for the upright orientation of the panels when positioned in the closed shape enclosing the interior space, wherein the panels comprise troughs of varying depth along the top edge of the enclosed interior space, and wherein a height dimension of each panel is largest at side edges extending between the bottom edge and the top edge so that the troughs extend downward from peaks at each side edge.

12. The hunting blind of claim 11, wherein the panels comprise a reflective exterior finish so that the blind, when positioned in the upright orientation and forming the closed shape enclosing the interior space for the hunter, provides a downward angle of the reflective exterior finish thereby reflecting more of the ground surface than features above the ground surface when the blind is viewed from positions on the ground radially away from the blind.

13. The hunting blind of claim 11, wherein the panels comprise troughs of varying depth along the top edge of the enclosed interior space, at least one trough sized and adapted to permit resting the barrel of a gun.

14. The hunting blind of claim 11, wherein the panels connected to one another so as to permit folding the panels in an accordion fashion into a stack of panels, and wherein the folded panels are unfoldable to setup the blind in the upright orientation upon the ground surface.

15. The hunting blind of claim 11 wherein the unfolded panels are adapted to be further supported in the upright orientation by a plurality of rod supports.

16. The hunting blind of claim 11 further comprising a plurality of anchor receptacles through which tent stakes may be used to secure the bottom edge of the unfolded panels.

17. A kit of components for a portable hunting blind comprising:
    a plurality of flat semi-rigid or rigid panels according to claim 11;
    a plurality of rod supports, wherein the panels are adapted to be supported by the rod supports when the panels are unfolded and arranged to enclose the interior space of the blind.

18. The kit of claim 17 further comprising a plurality of stakes for anchoring at least one bottom edge of the panels when the panels are unfolded and arranged to enclose the interior space of the blind.

19. The kit of claim 18 further comprising one or more straps for securing the panels when the panels are folded into a stack.

20. The kit of claim 19 further comprising a cover adapted to fit over the interior space created by the panels when unfolded and arranged to enclose the interior space.

* * * * *